(12) United States Patent  (10) Patent No.: US 7,769,033 B2
Sagawa  (45) Date of Patent: Aug. 3, 2010

(54) RADIO BRIDGE COMMUNICATION APPARATUS

(75) Inventor: Hisao Sagawa, Chiba (JP)

(73) Assignee: Futaba Corporation, Chiba (JP)

( * ) Notice: Subject to any disclaimer, the term of this patent is extended or adjusted under 35 U.S.C. 154(b) by 363 days.

(21) Appl. No.: 11/822,764

(22) Filed: Jul. 10, 2007

(65) Prior Publication Data

US 2008/0008148 A1    Jan. 10, 2008

(30) Foreign Application Priority Data

Jul. 7, 2006    (JP) .............................. 2006-188246

(51) Int. Cl.
*H04L 12/28* (2006.01)
(52) U.S. Cl. .................. 370/401; 370/395.54
(58) Field of Classification Search ........................ None
See application file for complete search history.

(56) References Cited

U.S. PATENT DOCUMENTS 6,747,979 B1 *    6/2004  Banks et al. ................. 370/401

7,400,634 B2 *    7/2008  Higashitaniguchi et al. ...... 370/395.53

* cited by examiner

*Primary Examiner*—Robert W Wilson
(74) *Attorney, Agent, or Firm*—Bacon & Thomas, PLLC

(57) ABSTRACT

A radio bridging device is used for a communications network. If a source host transmits a communications request directed to a destination host, the radio bridging device records an IP address and a MAC address of the source host and an IP address of the destination host in a local table. A state of the source host is set as "LOCAL" if the source host belongs to a segment where the radio bridging device belongs, and set as "AIR" if otherwise. Further, a state of the destination host is set as "SEARCH", and an ARP request directed to the destination host is broadcast. If an ARP response is received from the destination host, the state of the destination host is changed from "SEARCH" to "LOCAL" or "AIR" to be recorded in the local table together with a MAC address of the destination address.

10 Claims, 13 Drawing Sheets

FIG. 3A

FIRST RADIO DEVICE (IN SEQUENCE 1)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | LOCAL | — | — | 120 |
| — | 192.168.1.3 | SEARCH | — | — | |

FIG. 3B

SECOND RADIO DEVICE (IN SEQUENCE 2)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | AIR | 001 | — | 120 |
| — | 192.168.1.3 | SEARCH | — | — | |

FIG. 3C

THIRD RADIO DEVICE (IN SEQUENCE 2)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | AIR | 001 | 004 | 120 |
| — | 192.168.1.3 | SEARCH | — | — | |

FIG. 3D

SECOND RADIO DEVICE (IN SEQUENCE 4)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | AIR | 001 | — | xxx |
| — | 192.168.1.3 | SUSPEND | — | — | 20 |

FIG. 3E

THIRD RADIO DEVICE (IN SEQUENCE 4)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | AIR | 001 | 004 | xxx |
| CC:CC:CC:CC:CC | 192.168.1.3 | LOCAL | — | — | 120 |

FIG. 3F

FIRST RADIO DEVICE (IN SEQUENCE 5)

| MAC ADDRESS | IP ADDRESS | STATE | RADIO ADDRESS | REPEATER ADDRESS | TTL |
|---|---|---|---|---|---|
| AA:AA:AA:AA:AA | 192.168.1.1 | LOCAL | — | — | xxx |
| CC:CC:CC:CC:CC | 192.168.1.3 | AIR | 003 | 004 | 120 |

FIG.4

| STATE | MEANING |
|---|---|
| SEARCH | TERMINAL BEING SEARCHED |
| LOCAL | TERMINAL ON ETHERNET |
| AIR | TERMINAL VIA RADIO APPARATUS |
| SUSPEND | FAILURE IN SEARCHING TERMINAL |

RADIO BRIDGE COMMUNICATION APPARATUS

FIELD OF THE INVENTION

The present invention relates to a radio bridging device for obtaining route information to control a data source and a data destination in a case where a local area network is divided into a plurality of areas as segments and the divided areas are connected to one another via the radio bridging device.

BACKGROUND OF THE INVENTION

When host computers, which are communications terminals, perform data communications on a network, a router or a bridge as a relaying device retains communications route information and performs a communications control called routing, based on the communications route information thereof.

In this case, if, for example, a local area network (referred to as "LAN") is divided into a plurality of areas, such as a factory, a warehouse, and a management department at a specific floor of a building, and a wired terminal (referred to as "host") is disposed in each divided area (referred to as "segment") but the segments cannot be connected each other via cables, the segments must be able to be connected to one another by using radio devices as relaying devices.

This enables the hosts in the segments to easily communicate with one another via the radio devices even if the hosts are too remote from one another to communicate via cables.

Further, in a case where the network is divided into a plurality of areas and communications are performed via the radio devices as described above, the hosts to communicate may be transferred into or out of the divided segments in accordance with a user's request. For example, when a product is manufactured or managed at a factory, there are cases where a host needs to communicate with other hosts in other areas while being moved by a cart. Since, in this case, the host is moved between each area, cable communications are difficult but wireless communications using radio devices are possible.

(Reference 1) Japanese Patent Laid-open Application No. 2003-18197

However, information (data) transferred between networks is packetized and controlled by TCP/IP that is conventionally used as a communication protocol.

For a router specifying a data transmission route established by TCP/IP or a bridge that merely performs a relaying function, data transmissions are controlled at a data link layer or a physical layer, which are arranged lower than TCP/IP that is a communications protocol.

A radio device (referred to as "radio bridging device") having a bridging function used to connect between the divided segments must recognize, according to a destination of information (data) transmitted by a host in a segment where the radio device belongs, a product code (referred to as "MAC address") of a terminal device that specifies a destination host of the data and address information (referred to as "IP address") allocated to the terminal device on the LAN. Thus, upon a request of communications, the radio device connects the segments by selecting the MAC address of each host so that the source host and the destination host exchange information. Accordingly, information (data) can be certainly transmitted from the host in the segment to which the radio device belongs to a plurality of host including hosts in the other segments in accordance with a destination of the data.

Accordingly, information used for transmitting packet data between the segments on the LAN is usually recorded in a local table or a MAC table. If a radio device is used as a node for connecting the segments, it serves as a radio bridging device and retains the local table.

The address information and route information of each host recorded in the local table are preset by a LAN manager in a static manner if the number of hosts to exchange information is small and the hosts are not frequently transferred between networks.

However, when there are a large number of information terminals in the LAN, and elements of each host are easily changed such that the information terminal does not fixedly belong to a specific segment, destination route information is difficult to manage in the static manner as descried above. In this case, a dynamic routing scheme may be used to dynamically set the route information.

In a case where the dynamic routing scheme is applied to a wireless bridge that connects between the segments to transfer data, an address resolution protocol (ARP) request packet is broadcast at a specific timing. Thus, the IP and MAC address of each host belonging to each segment is acquired, and the addresses are stored together with a data route in a memory or the like.

However, the dynamic routing scheme has a drawback in that, since address information of each host on the LAN is regularly checked at a specific timing to search for route information, the hosts cannot exchange information while the route information is being searched for. Accordingly, the efficiency of transmitting information (traffic amount) on the LAN is degraded.

Further, in the dynamic scheme, the procedure is relatively complicated because a special packet obtained by processing data needs to be transferred. In addition, the address and route information of the host need to be stored all the time, thus laying a significant burden on a transmission device.

SUMMARY OF THE INVENTION

In this regard, the present invention provides a method for performing efficient communications between hosts in a case where a plurality of divided areas in a network are connected to one another via radio devices. It is, therefore, an object of the present invention to improve communications efficiency with which radio devices perform communications control on a host selected from each segment.

In accordance with the present invention, there is provided a radio bridging device used for a communications network in which a local area network having one or more hosts is divided into a plurality of segments, and one or more radio bridging devices are connected to each of the segments so that the segments are connected to one another via said one or more radio bridging devices, wherein, if a source host in the communications network transmits a communications request directed to a destination host, the radio bridging device records an IP address and a MAC address of the source host and an IP address of the destination host in a local table, wherein the radio bridging device performs:

a first process in which a state of the source host is set as "LOCAL" if the source host belongs to one of the segments where the radio bridging device belongs, and set as "AIR" if the source host belongs to another of the segments connected via the radio bridging device, a state of the destination host is set as "SEARCH", and the states of the source host and the destination host are recorded in the local table, a second process in which an ARP request directed to the destination host is broadcast if the state of the destination host is "SEARCH", and then if an ARP response is received from the destination host, the state of the destination host is changed from "SEARCH" to "LOCAL" or "AIR" to be recorded in the local table together with a MAC address of the destination address, and then if other radio bridging device is interposed in a transmission path to the MAC address of the destination host, a radio device address of said other radio bridging device is acquired to be retained in the local table for a specific amount of time, and a third process in which, if the ARP response to the ARP request is not received within a specific timeout time, the state of the destination host is changed into "SUSPEND" to be recoded in the local table together with a suspend TTL time.

A LAN area can be expanded by providing a repeater having a repeater address between two radio bridging devices for connecting between the segments.

In accordance with the present invention as described above, a communications route for each host can be independently established by setting an IP address, a subnet mask, a radio frequency, and an address of a device such as a bridge for connecting between networks.

Further, "LOCAL", "AIR", "SUSPEND", and the like, which designate states of each host, are merely an example. Alternatively, the states may be indicated by different state symbols or terms. For example, "LOCAL" may be indicated by "LC", "AIR" by "AR", "SUSPEND" by "SP", and "SEARCH" by "SC".

In the present invention, the radio bridging device retains, only for a specific duration, terminal route information for the communications device based on received communications information. Therefore, the radio bridging device need not communicate with the other radio bridging device at a regular interval, so that the traffic amount over the entire communications route can be reduced.

Further, it is not necessary for all radio bridging devices to have the same terminal route information, so that they retain only a minimally necessary amount of communications information. Therefore, only a small storage capacity is needed for the radio bridging device.

BRIEF DESCRIPTION OF THE DRAWINGS

The above and other objects and features of the present invention will become apparent from the following description of preferred embodiments given in conjunction with the accompanying drawings, in which:

FIGS. 3A to 3F illustrate exemplary contents of MAC address tables retained in the radio device in accordance with the embodiment of the present invention;

FIG. 4 illustrates states to be registered in the MAC address table;

DETAILED DESCRIPTION OF THE EMBODIMENTS

Figure 1:
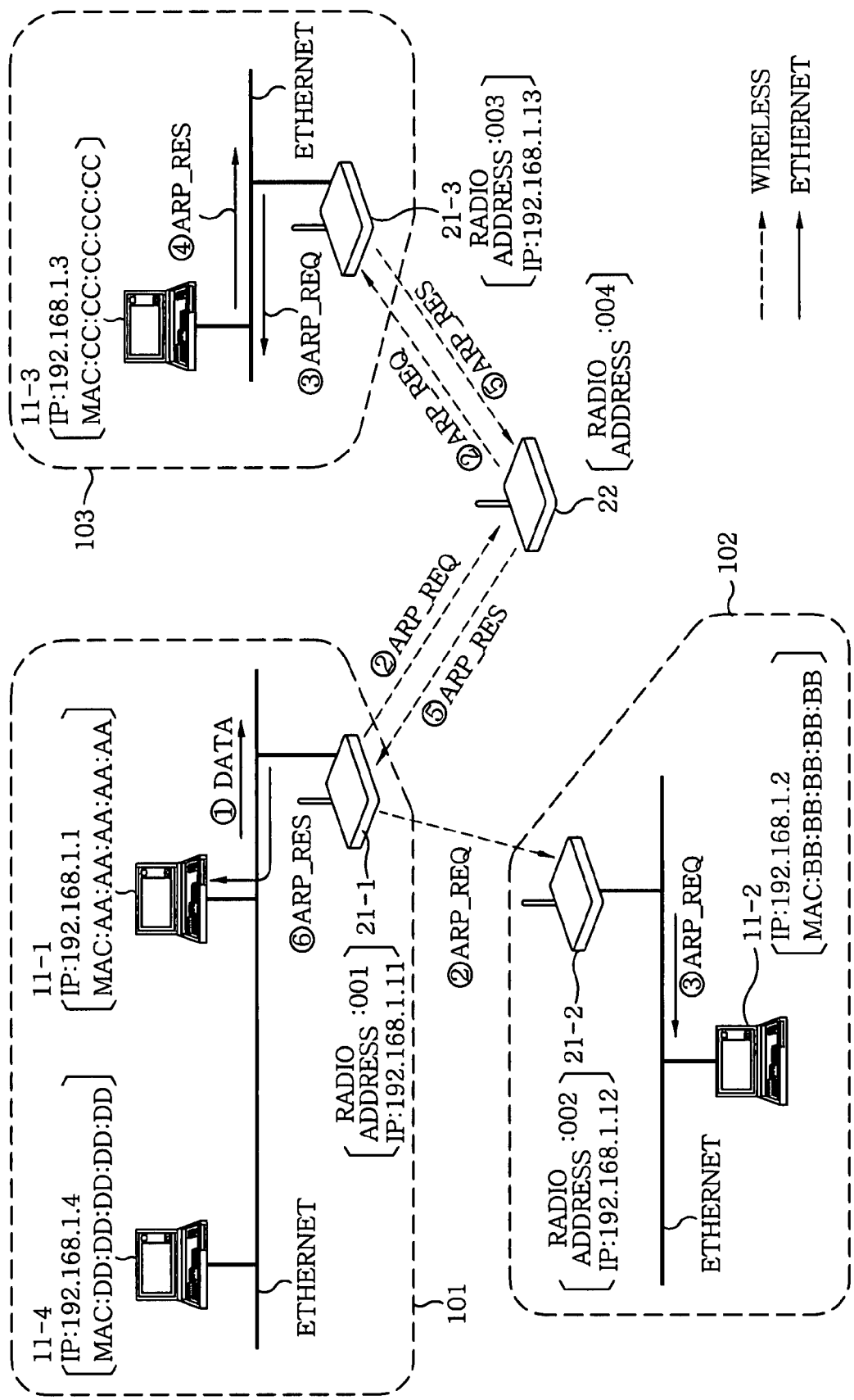
FIG. 1 is a schematic view illustrating wired and wireless connections of hosts and radio devices in accordance with an embodiment of the present invention.

FIG. 1 shows a configuration of a communications network (communications system) having a bridge function in accordance with an embodiment of the present invention. A local area network is divided into, for example, three wire-connected segments (Ethernet™). In each wire-connected segment, one radio bridging device (hereinafter referred to as "radio device") and at least one host are connected to different Ethernets.

That is, in the first wire-connected segment 101, a host 11-1, a host 11-4, and a first radio device 21-1 as a radio bridging device are connected. In the second wire-connected segment 102, a host 11-2 and a second radio device 21-2 as a radio bridging device are connected to another Ethernet. In a third wire-connected segment 103, a host 11-3 and a third radio device 21-3 as a radio bridging device are connected to still another Ethernet.

Each of the hosts 11 (11-1 to 11-4) has an IP address {192.168.1.X(=1, 2, 3, 4)} and a MAC address, and each of the radio devices 21 (21-1 to 21-3) has a radio device address (radio address) and an IP address allocated in advance. The first radio device 21-1 is connected to the third radio device 21-3, which is remote from the first radio device 21-1, via a repeater 22. In this case, a repeater address is allocated to the repeater 22.

If the hosts belong to the same Ethernet, they transmit and receive data inside one of the wire-connected segments. However, if a destination host does not belong to the wire-connected segment of other hosts, the respective hosts and wire-connected segments are connected to remote wire-connected segments via the radio devices 21 (21-1 to 21-3), thereby constituting a single network.

Further, the repeater 22 located between the two of the radio devices 21 serves as a relaying device for only relaying signals. Herein, there may be two repeaters.

Between the first wire-connected segment 101 and the second wire-connected segment 102, the host 11-1 and the host 11-2 communicate via the first radio device 21-1 and the second radio device 21-2. Between the first wire-connected segment 101 and the third wire-connected segment 103, the host 11-1 and the host 11-3 communicate via the first radio device 21-1, the repeater 22, and the third radio device 21-3.

In each wire-connected segment, the host 11 is connected to the radio device 21 via a cable, the radio devices 21 (21-1 to 21-3) communicate with one another wirelessly, and some of the radio devices 21 and the repeater 22 communicate with one another wirelessly. Since the first radio device 21-1 is remote from the third radio device 21-3, they communicate via the repeater 22, but the number of repeaters may be set otherwise.

Figure 2:
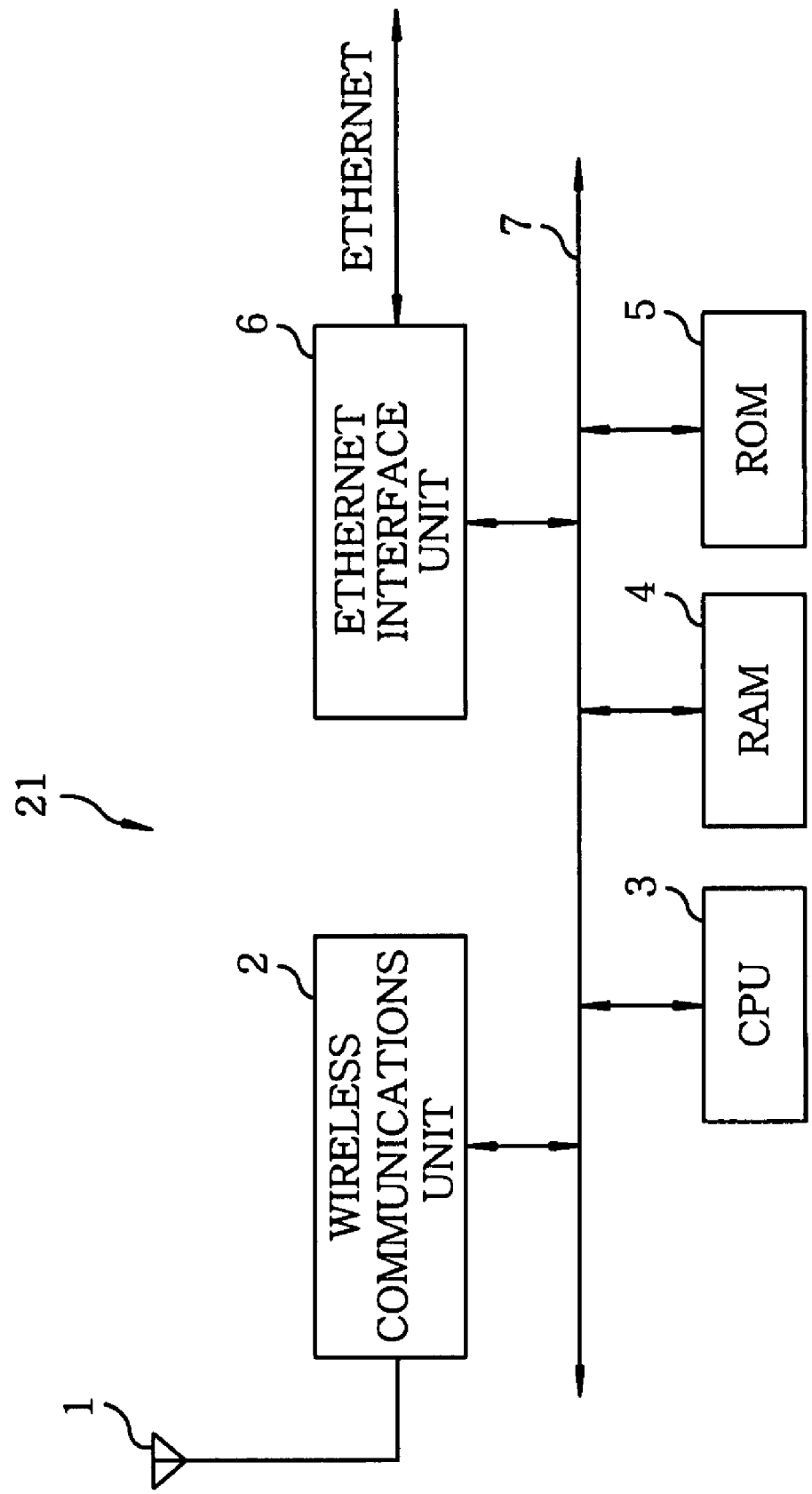
FIG. 2 is a block diagram illustrating a radio device in accordance with the embodiment of the present invention.

Further, FIG. 2 shows a block diagram of the radio device 21.

First, a wireless antenna 1 transmits data from each of the hosts 11 (11-1 to 11-4) to an external device or receives a signal from another host 11.

Herein, it is assumed that IEEE802.11a/b/g/ is used to set the frequency of signals to be transmitted and received by the wireless antenna 1, and that the number of established channels is 14.

Further, a wireless communications unit 2 is configured with a hardware for communicating with an external device according to a specific data communications scheme under control of a central processing unit (CPU) 3. The data communications scheme for the wireless communications unit 2 is for transmitting and receiving data by using various modulation methods, and the number of the data communications scheme is not limited.

The CPU 3 functions as a controller for controlling general operation of the radio device 21. The CPU 3 performs communications of the wireless communications unit 2 or the Ethernet interface unit 6 in accordance with a program.

Further, a random access memory (RAM) 4 is used as a working area when the CPU 3 executes the program and stores various computational results. In the present embodiment, the RAM 4 stores a MAC address table. A read only memory (ROM) 5 stores various programs executed by the CPU 3, various set information used by the CPU 3 in processing, and the like.

In the present embodiment, signal transmission and reception between hosts in the wire-connected segments 101, 102, and 103 remote from one another are performed via the radio device 21.

Specifically, when a signal transmitted from one of the hosts 11 on the Ethernet is directed to a target host, the signal is transmitted to an interface unit 6 via the Ethernet. Then, the signal is converted into a format that can be handled by the Ethernet interface unit 6 and transmitted to the wireless communications unit 2 via a bus 7. The wireless communications unit 2 converts the received signal into an optimal format, and thus converted signal is transmitted from the wireless antenna 1 to another radio device 21.

Meanwhile, a signal that comes from outside follows an opposite process. That is, when a signal is transmitted from a target host 11 to the wireless antenna 1 via the radio device 21, it is delivered to the wireless communications unit 2. The signal is formatted by the wireless communications unit 2 and then sent to the Ethernet interface unit 6 via the bus 7. Then, the signal is converted into a format that can be handled by the Ethernet interface unit 6 and transmitted to the host 11 via the Ethernet.

In the present embodiment, data transmission from the host 11-1 to the host 11-3 in accordance with the following data transmission and reception sequence will be described by way of example. First, a MAC address table (also called as a local table or a local address table) shown in FIGS. 3A to 3F will be described.

MAC address tables shown in FIGS. 3A to 3F are established and stored in the respective radio devices 21, so that subsequent communications can be performed efficiently based on the stored data by temporarily storing a combination of once acquired IP and MAC addresses.

The MAC address table stores information on the MAC address(es) of host(s) 11 connected to the Ethernet; the IP address(es); state(s) of the host(s) 11; radio device address (es); repeater address(es); TTL(s); and the like. The above information is included in a header appended to the communications data, and is used to manage the communications route from the source host 11 to the destination host 11 as a target.

Further, since communications between the host 11-1 and the host 11-3 are mainly discussed in the example shown in FIGS. 3A to 3F, the MAC address tables of the radio devices 21 are shown as if they only had the information on the host 11-1 and the host 11-3. However, it will be easily understood that the information on the host 11-2 is also retained in each radio device 21 in the same manner.

Here, the MAC address refers to a product number allocated to each of the hosts 11 to control access to a network such as an Ethernet, which differs from host 11 to host 11.

Further, the IP address refers to an identification number allocated to a host on the network. The IP address is uniquely allocated to the host 11 or the radio device 21 as a terminal when building a network. Since the IP address is well known, a detailed description thereof will be omitted.

The present embodiment aims at obtaining a MAC address of a target host as a data destination, based on a MAC address and an IP address of a data source host and an IP address of a target host. Whenever the information of items such as the MAC address of each host 11 is updated, the MAC address table is updated.

Meanings of the four states described in the MAC address table will be described with reference to state fields shown in FIG. 4.

First, "SEARCH" refers to a state where the radio device 21 is searching for a destination host by receiving data on the Ethernet required by the source host 11 through a promiscuous reception (which means receiving all incoming data). Specifically, when the address of the target host 11 does not exist on the MAC address table, the state is registered as "SEARCH" on the MAC address table to search for the destination host 11. The search result changes the state of the destination host 11 from "SEARCH" to another.

"LOCAL" refers to a state, as a result of the search during the "SEARCH" state, where the destination host 11 is connected to a terminal on the same Ethernet as the source host 11.

"AIR" refers to a state, as a result of the search during the "SEARCH" state, where the target host 11 is connected to a terminal on a different Ethernet from that of the source host 11, which means, in the present embodiment, the destination host 11 as a target is connected to a terminal via a radio device.

Further, the "AIR" or "LOCAL" state is registered on the MAC address table after the MAC address of the destination host 11 as a target is recognized.

For example, in the present embodiment, if the radio device 21-1 and the host 11-1 are connected to the same Ethernet and the MAC address of the host 11-1 is recognized, the radio device 21-1 registers the state of the MAC address table for the host 11-1 as "LOCAL". Meanwhile, the radio device 21-1 and the host 11-3 are connected to different Ethernets. Accordingly, when the MAC address of the host 11-3 is recognized, the radio device 21-1 registers the state of MAC address table for the host 11-3 as "AIR".

Finally, "SUSPEND" refers to a state where the target host 11 is not discovered as a result of the search during the "SEARCH" state. In this case, "TTL" (Time To Live) that will be described later is indicated, and "SUSPEND TTL" is set, so that data directed to a host registered as "SUSPEND" within the time are all ignored.

In the MAC address table, a radio device address and a repeater address refer to an address of the radio device 21 and an address of the repeater 22, respectively.

Further, in FIGS. 3A to 3F, "TTL" (Time To Live) at a rightmost side of the MAC address table refers to a period of time for which the information for each host 11 is being registered in the MAC address table. It is considered that maintaining the information of the host 11 as "LOCAL", "AIR", or "SUSPEND" on the MAC address table for an excessively long time without any request for communications increases a load on the communications route, and may lead to a communications delay. To this end, the TTL is set to a specific value. When there is no subsequent communications within the set TTL, the registered information for each host 11 is deleted from the MAC address table. However, when there is a new communications request within the set time, the TTL is reset to an initial value.

In the present embodiment, the initial value of the normal TTL is set to "120". In the present embodiment, the "normal TTL" is distinguished from another TTL called "SUSPEND TTL" that may also be registered in the MAC address table. An initial value of the "SUSPEND TTL" is set to "20", unlike the normal TTL.

Figure 5A:
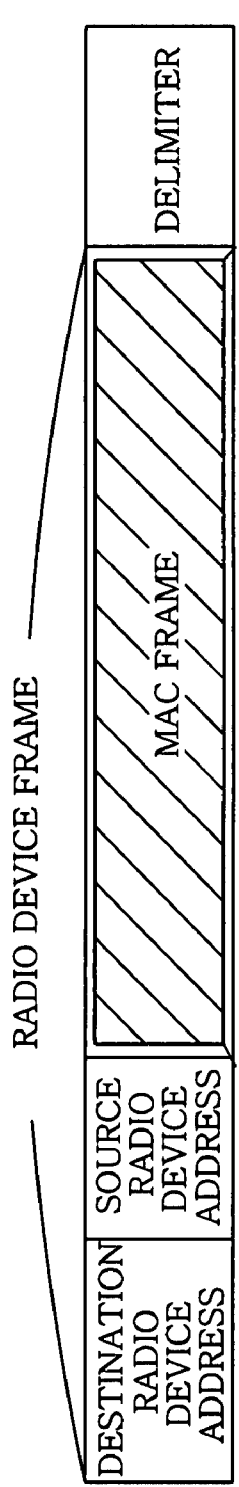
FIGS. 5A to 5C illustrate configurations of frames contained in communications information.
Figure 5B:
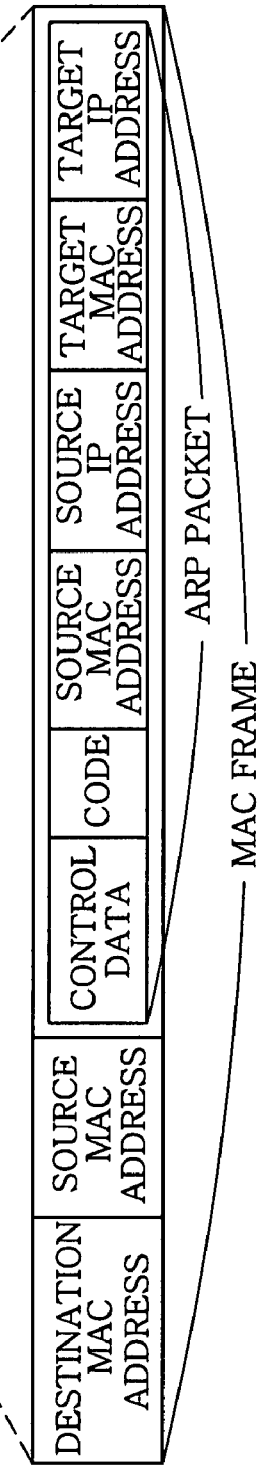
Figure 5C:

Finally, some formats of data frames packetized on the Ethernet are illustrated in FIGS. 5A to 5C.

In FIG. 5A, a radio device frame includes a MAC frame, and a header having a destination radio device address and a source radio device address. The source radio device address refers to an address of the radio device 21 that functions as a source, and the destination radio device address refers to an address of the radio device 21 or repeater 22 other than the source.

The radio device 21 broadcasts the destination radio device address. In the present embodiment, each radio device 21 transmits a radio device frame as ARP_REQ or ARP_RES (ARP represents an Address Resolution Protocol used in a TCP/IP communications protocol group, REQ represents Request, and RES represents Response).

Further, FIG. 5B shows contents of the MAC frame stored in the radio device frame.

A header of the MAC frame stores a destination MAC address, a source MAC address, and, for example, an ARP packet as a control information. Here, the source MAC address refers to an address of the host 11 that functions as a source, and the destination MAC address refers to an address of the destination host 11 that functions as a data communications correspondent.

The radio device 21 broadcasts the destination radio device address. Meanwhile, the ARP packet includes control information indicating a protocol type; a code indicating ARP_REQ or ARP_RES; a source MAC address; a source IP address; a destination MAC address of a target; and an IP address of the target. In a case where the host 11 transmits simple data other than ARP_REQ or ARP_RES, the MAC frame includes data, rather than the ARP packet.

FIG. 5C shows a frame in a case where a repeater is provided for a wireless relaying. The frame has substantially the same data structure as that of the radio device frame, except that it further includes repeater address information, a transmitted data length, and a delimiter as a mark for dividing respective elements.

The repeater is merely a signal relaying device. The communications device used as bridge radio device has a transmission and reception function, and may be used as a repeater only by writing therein a program for controlling the CPU 3 or a RAM.

Here, the ARP inputs the IP address for the target host 11 into ARP_REQ (a protocol that requests a MAC address of a target host from the source host), and broadcasts it to the network in order to obtain an MAC address corresponding to the IP address. Then, the target host 11 as a destination inputs its own MAC and IP addresses into ARP_RES (a response of the target host to the source host) and unicasts it. Finally, after transmitting ARP_REQ, the host 11 can obtain the MAC address of the destination host 11 by receiving ARP_RES.

Further, the obtained information is retained in a storage unit of each host 11 for a specific time (30 minutes). This enables data transmissions to a correspondent without transmitting ARP_REQ, which is a protocol for checking a MAC address of the correspondent.

Hereinafter, an overview of data (ARP_REQ) transmission and reception between Ethernet connections in accordance with the present embodiment and an exemplary case will be described.

The exemplary case will be described in a sequence indicated by circled numbers in FIG. 1.

Although the MAC address ("CC:CC:CC:CC:CC") of the host 11-3 is shown in FIG. 1, the present embodiment assumes that it is not known at the present stage.

(Sequence 1)

First, the host 11-1 on the Ethernet transmits data directed to the host 11-3. The data may have an arbitrary format.

The first radio device 21-1, connected to the Ethernet in the same segment as that of the host 11-1, receives the data directed to the host 11-3.

Upon receipt of the data from the source host 11-1, the first radio device 21-1 registers information for the source host 11-1 and the destination host 11-3 in its MAC address table, based on the received data.

Specifically, since the data received by the first radio device 21-1 contains the MAC address ("AA:AA:AA:AA:AA") and the IP address ("192.168.1.1") of the source host 11-1, and the IP address ("192.168.1.3") of the destination host 11-3, the first radio device 21-1 performs registration in the MAC table of FIG. 3A based on such information. However, the first radio device 21-1 does not register the MAC address of the host 11-3 since the data received by the first radio device 21-1 does not contain the MAC address of the host 11-3.

As the MAC address of the source host 11-1 is registered in the MAC address table of the first radio device 21-1, it is revealed that the host 11-1 and the first radio device 21-1 are connected to the Ethernet in the same segment. Accordingly, the first radio device 21-1 registers the state of the host 11-1 as "LOCAL" in the MAC address table. Meanwhile, the MAC address of host 11-3 is not yet revealed and, at the present stage, it is not known whether the first radio device 21-1 and the host 11-3 are connected to the same Ethernet or need to communicate via the radio device 21. Accordingly, a determination cannot be made as to whether the state is "LOCAL" or "AIR", and the first radio device 21-2 registers the state as "SEARCH" in the MAC address table.

Since the state of the host 11-1 is "LOCAL" and the first radio device 21-1 can recognize that the other radio device 21 is not via the repeater 22 when receiving the data from the host 11-1, the first radio device 21-1 does not register information of the radio device address or the repeater address in the host 11-1 information column of the MAC address table. The first radio device 21-1 also registers "120" as the initial value in the TTL.

Since the state of the host 11-3 is "SEARCH" and a route from the first radio device 21-1 to the host 11-3 is unknown, the first radio device 21-1 does not register information of the radio device address and the repeater address for the host 11-3 in the MAC address table.

The MAC address table of the first radio device 21-1 registered in sequence 1 is shown in FIG. 3A.

The data from the host 11-1 is also transmitted to the host 11-4. In sequence 1, however, the first radio device 21-1 does not respond since the IP address of the host 11-4 differs from the requested IP address.

(Sequence 2)

Subsequently, upon receipt of the data from the host 11-1, the first radio device 21-1 broadcasts ARP_REQ from the wireless antenna 1 connected to the first radio device 21-1. Here, ARP_REQ refers to an ARP request. Accordingly, the first radio device 21-1 broadcasts a MAC frame containing an ARP packet in response to the ARP request.

In ARP_REQ, the MAC frame contains the destination radio device address and the source radio device address at a header thereof.

In this case, the source radio device address is the radio device address of the first radio device 21-1. Meanwhile, since the destination is not specified at this instant, the destination radio device address is not revealed.

The MAC frame contains the ARP packet, and the header of the MAC frame contains an MAC address of unknown destination and an MAC address of the source host 1 for broadcasting the ARP_REQ.

The ARP packet contains control information that indicates a protocol type and the like, an ARP_REQ code, a MAC address of the source host 11-1, an IP address of the source host 11-1, and an IP address of the target host 11-3. The MAC address of the target host 11-3 is transmitted, containing only an ARP packet request without any specified information.

Upon receipt of ARP_REQ from the first radio device 21-1, the repeater 22 transmits ARP_REQ in the form of a frame having a header that stores a destination radio device address and a source radio device address. Meanwhile, since the destination is not specified at this instant, the destination radio device address is unknown.

In the present embodiment, since the first radio device 21-1 is located relatively close to the second radio device 21-2, ARP_REQ transmission and reception can be performed wirelessly, not via the repeater 22. On the other hand, since the first radio device 21-1 is remote from the third radio device 21-3, the ARP_REQ transmission and reception is performed via the repeater 22.

Upon receipt of ARP_REQ from the first radio device 21-1, the second radio device 21-2 registers information of the source host 11-1 and target host 11-3 in the MAC address table, based on the received ARP_REQ.

Specifically, since the data received by the second radio device 21-2 contains the MAC address ("AA:AA:AA:AA:AA") and the IP address ("192.168.1.1") of the source host 11-1, and the IP address ("192.168.1.3") of the destination host 11-3, the second radio device 21-2 performs registration in the MAC table of FIG. 3B based on such information. However, the second radio device 21-2 does not register the MAC address of the host 11-3 since the data received by the second radio device 21-2 does not contain the MAC address of the host 11-3.

As the MAC address of the source host 11-1 is registered in the MAC address table of the second radio device 21-2, it is revealed that the host 11-1 and the second radio device 21-2 belong to different segments. Accordingly, the second radio device 21-2 registers the state of the host 11-1 as "AIR" in the MAC address table. Meanwhile, since it cannot be determined, in this stage, whether or not the host 11-3 is connected to the Ethernet in the same segment, the second radio device 21-2 registers "SEARCH" in the MAC address table to indicate that the state of the host 11-3 of FIG. 3B is being searched for.

Here, since ARP_REQ received by the second radio device 21-2 contains the source radio device address, the second radio device 21-2 registers a radio device address "001" for the host 11-1 in the MAC address table. However, the second radio device 21-2 does not register a repeater address since it receives ARP_REQ directly from the first radio device 21-1, not via the repeater. As the state is changed into "AIR", TTL is also updated and the second radio device 21-2 registers the TTL of the MAC address table as "120".

Since the state of the host 11-3 is "SEARCH" and a route from the first radio device 21-1 to the host 11-3 is unknown, the second radio device 21-2 does not register the radio device address of the host 11-3 and the repeater address.

Upon receipt of ARP_REQ from the first radio device 21-1 as a source via the repeater 22, the third radio device 21-3 registers information of the source host 11-1 and target host 11-3, based on the received ARP_REQ in the MAC address table.

Specifically, since the data received by the third radio device 21-3 contains the MAC address ("AA:AA:AA:AA:AA") and the IP address ("192.168.1.1") of the source host 11-1 and the IP address ("192.168.1.3") of the destination host 11-3, the third radio device 21-3 performs registration in the MAC table of FIG. 3C based on such information. However, the third radio device 21-3 does not register the MAC address of the host 11-3 since the data received by the first radio device 21-3 does not contain the MAC address of the host 11-3.

As the MAC address of the source host 11-1 is registered in the MAC address table of the third radio device 21-2, it is revealed that the host 11-1 and the third radio device 21-3 belong to different segments. Accordingly, the third radio device 21-3 registers the state of the host 11-1 as "AIR" in the MAC address table. Meanwhile, the third radio device 21-3 registers the state of the host 11-3 as "SEARCH" in the MAC address table since it is searching for the host 11-3.

Since ARP_REQ received by the third radio device 21-3 contains the source radio device address, the third radio device 21-3 registers a radio device address "001" for the host 11-1 in the MAC address table. The third radio device 21-3 also registers a repeater address "004" in the MAC address table since it receives ARP_REQ from the first radio device 21-1 via the repeater. The third radio device 21-3 also registers the TTL as "120".

Since the state of the host 11-3 is "SEARCH" and a route from the first radio device 21-1 to the host 11-3 is unknown, the third radio device 21-3 does not register the radio device address of the host 11-3 and the repeater address.

The MAC address tables of the second radio device 21-2 and the third radio device 21-3 registered in sequence 2 are shown in FIGS. 3B and 3C.

(Sequence 3)

In sequence 3, the second radio device 21-2 and the third radio device 21-3 receive ARP_REQ from the first radio device 21-1 via their wireless antenna 1, and transmit the received ARP_REQ to the host 11-2 and the host 11-3 on the Ethernet to which the second radio device 21-2 and the third radio device 21-3 are connected, respectively.

Since ARP_REQ, as the radio device frame which the second radio device 21-2 transmits to the host 11-2, does not contain the IP address of the host 11-2 as the target IP address, the host 11-2 does not respond to ARP_REQ, and ARP_REQ transmitted by the second radio device 21-2 does not contain data on the host 11-2.

Meanwhile, since ARP_REQ, as the radio device frame which the third radio device 21-3 transmits to the host 11-3, contains the IP address of the host 11-3 as the target IP address, the host 11-3 receives ARP_REQ from the third radio device 21-3.

Upon receipt of ARP_REQ from the source host 11-1, the host 11-3 retains the MAC address and IP address information for the host 11-1. However, the host 11-3 does not retain information of a state of host, a radio device address, a repeater address, and a TTL, unlike the third radio device 21-3.

(Sequence 4)

After receiving ARP_REQ, the host 11-3 transmits ARP_RES directed to the host 11-1 on its Ethernet. To this end, it transmits the MAC frame shown in FIG. 5B that contains an ARP packet corresponding to ARP_RES. ARP_RES contains the ARP_REQ information. However, the ARP_REQ information has been already registered in the radio device 21. Accordingly, upon receipt of ARP_RES, the radio device 21 has only to register in the MAC address table such information that is not stored in ARP_REQ, or updated information from that of the received ARP_REQ.

The same also applies to a next sequence 5.

In sequence 4, since the host 11-2 does not transmit ARP_RES, the second radio device 21-2 does not receive ARP_RES. Accordingly, the MAC address, the IP address, the state, the radio device address and the repeater address for the host 11-1 are not changed in the MAC address table of the host 11-2, and are same as those in sequence 2. However, the TTL information is changed. That is, "XXX" as TTL of the host 11-1 indicates that a specific time has elapsed while sequence 2 is shifted to sequence 4. Here, "XXX" may be between "119" and "1" as an effective value. If "XXX" of the TTL is equal to "0", the host 11 information registered in the MAC address table is deleted.

Meanwhile, the MAC address, the IP address, the radio device address, and the repeater address for the host 11-3 are not changed in the MAC address table of the host 11-2, and are same as those in sequence 2. However, the state and the TTL are changed.

That is, since it is revealed that the host 11-3 is not connected to the Ethernet to which the second radio device 21-2 is connected, the second radio device 21-2 changes the state of the MAC address table for the destination host 11-3 from "SEARCH" to "SUSPEND".

Accordingly, the second radio device 21-2 changes the TTL for the host 11-3 into "20" as "SUSPEND TTL".

Furthermore, in the present embodiment, when "SUSPEND" is registered in the MAC address table, the second radio device 21-2 does not transmit data directed to the host 11-3.

Meanwhile, the third radio device 21-3 receives ARP_RES from the host 11-3. When it is determined from the received ARP_RES that information of the source host 11-3 and target host 11-1 is changed, the third radio device 21-3 registers the changed information in the MAC address table.

Specifically, ARP_RES received by the third radio device 21-3 contains the MAC address of the host 11-3, which is not stored in ARP_REQ. Accordingly, the third radio device 21-3 newly registers "CC:CC:CC:CC:CC" in the MAC address of the MAC address table of the host 11-3. Further, since it is revealed from the MAC address information of the host 11-3 that the host 11-3 belongs to the same segment as that of the third radio device 21-3, the third radio device 21-3 changes the state of the MAC address table of the host 11-3 that was registered as "SEARCH" in sequence 2 into "LOCAL". As the state is changed into "LOCAL", the third radio device 21-3 registers the TTL of the MAC address table of the host as "120".

Furthermore, the IP address is not changed from that registered when the third radio device 21-3 received ARP_REQ. As the third radio device 21-3 registers the state for the host 11-3 as "LOCAL" in the MAC address table, it is revealed that the radio device address and the repeater address of the MAC address table, which was unknown, need not to be registered.

Meanwhile, in the MAC address table of the third radio device 21-3 for the host 11-1, TTL is changed from "120" to "XXX", but this process is same as that of the second radio device 21-2.

Among the information for the host 11-1 in the MAC address table of the third radio device 21-3, only the TTL is changed by the transition from sequence 2 to sequence 4.

The MAC address tables registered in the second radio device 21-2 and the third radio device 21-3 in sequence 4 are shown in FIGS. 3D and 3E, respectively.

(Sequence 5)

Upon receipt of ARP_RES from the host 11-3, the third radio device 21-3 transmits ARP_RES to the first radio device 21-1 via the repeater 22, in a manner opposite to the reception of ARP_REQ. In response to ARP_RES received from the source host 11-3, the first radio device 21-1 changes the MAC address table based on the obtained data.

That is, when receiving ARP_RES that contains information that is not stored in ARP_REQ, the first radio device 21-1 changes the MAC address table information based on such newly received information in sequence 5.

Specifically, ARP_RES received by the first radio device 21-1 contains the MAC address of the host 11-3, the radio device address of the third radio device 21-3, and the repeater address of the repeater 22, which are not contained in ARP_REQ. Accordingly, the first radio device 21-1 newly registers the MAC address, the radio device address and the repeater address for the host 11-3 in the MAC address table as "CC:CC:CC:CC:CC", "003", and "004", respectively, which were not registered in the sequence 1.

As the MAC address of the host 11-3 is registered in the MAC address table of the first radio device 21-1, the first radio device 21-1 determines that the host 11-3 belongs to other segment from that of the first radio device 21-1, and changes the state of the MAC address table of the host 11-3 that was registered as "SEARCH" in sequence 1 into "AIR". As the state of the host 11-3 is changed into "AIR", the first radio device 21-1 newly registers the TTL of the MAC address table in the host as "120".

Meanwhile, TTL in the MAC address table for the host 11-1 retained in the first radio device 21-1 is changed from "120" to "XXX". Similarly to the case of the second radio device 21-2, this change in TTL indicates that a specific time within 120 seconds has elapsed while sequence 1 is shifted to sequence 5. Among the information for the host 11-1 in the MAC address table of the first radio device 21-1, only the TTL is changed by the transition from sequence 1 to sequence 5.

The MAC address table registered in the first radio device 21-1 in sequence 5 is shown in FIG. 3F.

Although a reference number is not indicated in FIG. 1, the first radio device 21-1 finally transmits data to the host 11-1 upon receipt of ARP_RES. In response to the data, the host 11-1 retains the MAC and IP address information for the host 11-3. The host 11-1 needs not to retain the information of the state of host, the radio device address, the repeater address and the TTL of the MAC address table, like the host 11-3.

In accordance with the above sequence, each radio device 21 can register the IP and MAC addresses of the source host 11-1 and/or the target host 11-3, and the wireless and repeater addresses information indicating the route to the host 11-3 in the MAC address table.

The host 11-1 as a source of ARP_REQ retains the IP and MAC addresses of the target host 11-3, and the host 11-3 as a source of ARP_RES retains the IP and MAC addresses of the host 11-1 as the ARP_REQ source. With such information, the source host 11-1 can exchange data directly with the target host 11-3 without requiring the host 11-1 to transmit ARP_REQ again.

That is, in the present embodiment, the source host 11-1 transmits ARP_REQ to check the MAC address of the destination host 11-3 and receives ARP_RES from the host 11-3. The transmission/reception of the ARP_REQ or ARP_RES is performed via the radio device 21, and the radio device 21 finally retains the IP and MAC addresses of the source host 11-1 and the destination (target) host 11-3, the radio device address of other radio device 21 and the repeater address of the repeater 22. In accordance with this sequence, the radio device 21 can establish the MAC address table as shown in FIG. 3F, and find out whether or not the source host 11-1 and the target host 11-3 are connected to the same Ethernet, and, if they are connected to different Ethernets, via which radio device or repeater the source host 11-1 and the target host 11-3 are communicating.

In addition to the above information, the TTL for host 11 is set in the MAC address table of each radio device 21. By setting the TTL, if there is no communications request for a specific time, the information registered in the MAC address table is deleted for the host having TTL=0, and can be updated to reflect a change in the network.

The route information is retained only for a specific time by setting the host TTL in the MAC address table as described above. In the present embodiment, however, the TTL is set as short as "120 seconds", and ARP_REQ is transmitted only when there is a communications request with the target host. Thus, unnecessary traffic can be reduced, compared to a case where the radio device 21 transmits ARP_REQ regularly all the time. The present embodiment is especially effective if the radio device 21 is movable; and, more particularly, when there is only a single communication or only a single communications request regarding the radio device 21, or when there are several communications requests but a communications request regarding the target host 11 is terminated before TTL becomes 0.

Since a target host is unknown in a segment where the state of the host 11-3 is registered as "SUSPEND" in the MAC address table, the data is not transmitted to the target host 11-3.

These information and settings in the present embodiment can reduce traffic over the entire communications route.

In the present embodiment, each radio device 21 retains the information on the route to the target host 11-3, the IP and MAC address information of each host 11, and the MAC and IP address information of other hosts retained by the host 11, only for a specific time in the MAC address table. In addition, the radio device 21 and the host 11 retain the information for a different time.

Whereas a time ("TTL") for which each host 11 retains the information of other host 11 is, for example, "30 minutes", a time ("TTL") for which each radio device 21 retains the information of the MAC address table is, for example, "120 seconds". Accordingly, when TTL for the host 11 in the MAC address table of the radio device 21 becomes 0, the radio device 21 deletes the host 11 information from the MAC address table.

Therefore, even if the information for other target host 11-3 is retained in the source host 11-1, it does not always remain in the MAC address table of the radio device 21. That is, even though the host 11-1 could obtain a communications route to the target host 11-3 by transmitting ARP_REQ and receiving ARP_RES from the target host 11-3, when the information on the route to the target host 11-3 is deleted from the MAC address table of the radio device 21, the data cannot be transmitted from the source host 11-1 to the target host 11-3. To solve this problem, the radio device 21 establishes the MAC address table as shown in FIG. 3F by broadcasting ARP_REQ while the information for the target host 11-3 is retained in the source host 11-1, so that the information on the route to the target host 11 is obtained to perform communications therebetween.

Specifically, if the radio device 21 does not retain the route information to the target host 11-3 when receiving data from the source host 11-1, the radio device 21 itself broadcasts ARP_REQ to other radio device 21 or the repeater 22.

As a result, a host that has transmitted ARP_RES is retained as a target host in the radio device 21, and the radio device 21 obtains the communications route to the target host.

Thus, even when there is no ARP_REQ from the host 11-1, the target host 11-3 can receive data from the host 11-1. That is, if there is a communications request from the source host 11-1 to the target host 11-3, the radio device 21 serves as an ARP_REQ source in place of the host 11 so that a necessary communications route can be obtained. Such flexible settings in the present embodiment can reduce unnecessary traffic on the communications route.

In accordance with RIP scheme that has been conventionally used as a routing protocol for communications, the respective radio devices share the MAC address table information and perform communications whenever a specific time elapses. In this case, when a plurality of channels are provided to the radio device 21, communications speed of each channel gets lower in reverse proportion to the number of the channels and traffic reduction is required. Therefore, unnecessary communications loads and tasks are increased, thereby deteriorating the efficiency.

However, in the present embodiment, the MAC address table is established by performing communications only when required, and each radio device 21 has only the necessary route information to the target host 11-3. Accordingly, it is not necessary for all the radio devices 21 to share the MAC address table information. Further, even though the host 11 information is deleted from the MAC address table, the radio device 21 may register the route information by re-performing the ARP process, as described above. Furthermore, while the host 11 information is registered as "SUSPEND" in the MAC address table, communications are blocked and data is deleted. Thus, in accordance with the present embodiment, even if there are many channels in the radio device 21, traffic on the communications route can be reduced compared to the conventional case.

Figure 6:
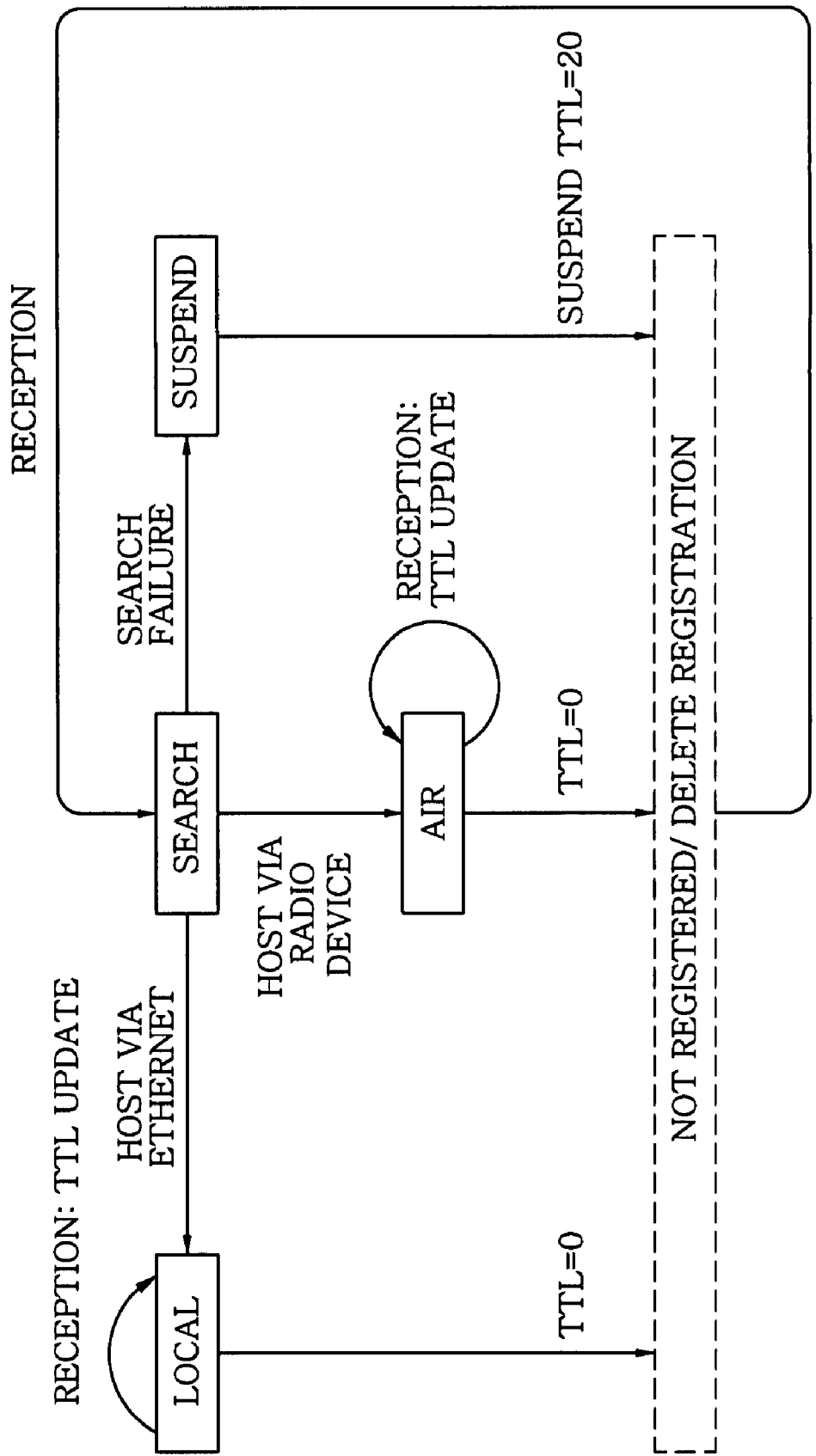
FIG. 6 illustrates a state transition diagram of data received by the radio device.

A sequence of updating the MAC address tables will be described with reference to a state transition diagram of FIG. 6.

First, when the radio device 21 receives data from the host 11 connected to the Ethernet via the Ethernet or from other radio device 21 via a wireless medium, the radio device 21 recognizes new data registration and registers the state as "SEARCH" in the MAC address table. When the radio device 21 receives ARP_RES from the destination as a response to ARP_REQ, it recognizes that the host 11 is connected to the same Ethernet as that of the radio device 21. The radio device 21 then updates the state from "SEARCH" to "LOCAL" in the MAC address table. Simultaneously, the radio device 21 updates TTL into "120". When there is a new communication within 120 seconds set as TTL after the state is updated into "LOCAL", the TTL value is updated. When there is no new communication, the TTL value becomes 0 and the registered information for the host 11 is deleted from the MAC address table.

When the radio device 21 receives ARP_RES from the host 11 via the radio device 21 as a response to ARP_REQ, the radio device 21 updates the state from "SEARCH" to "AIR" in the MAC address table. Simultaneously, the radio device 21 updates TTL into "120". When there is a new communication within 120 seconds set as TTL after the state is updated into "AIR", TTL is updated. When there is no new communication, TTL becomes 0 and the information for the host 11 is deleted from the MAC address table.

However, when the radio device 21 does not receive ARP_RES as a response to ARP_REQ from the destination within a separately set timeout time, the radio device 21 updates the state into "SUSPEND" in the MAC address table, and newly sets the TTL to be "20" as "SUSPEND TTL". While the state of the MAC address table indicates "SUSPEND", it is assumed that a route to the destination host 11 is unknown and ARP_REQ is not transmitted to the destination host 11.

When there is no new communication within the 2.0 seconds set as the "SUSPEND TTL" after the state is updated into "SUSPEND", the information for the host 11 is deleted from the MAC address table.

Figure 7:
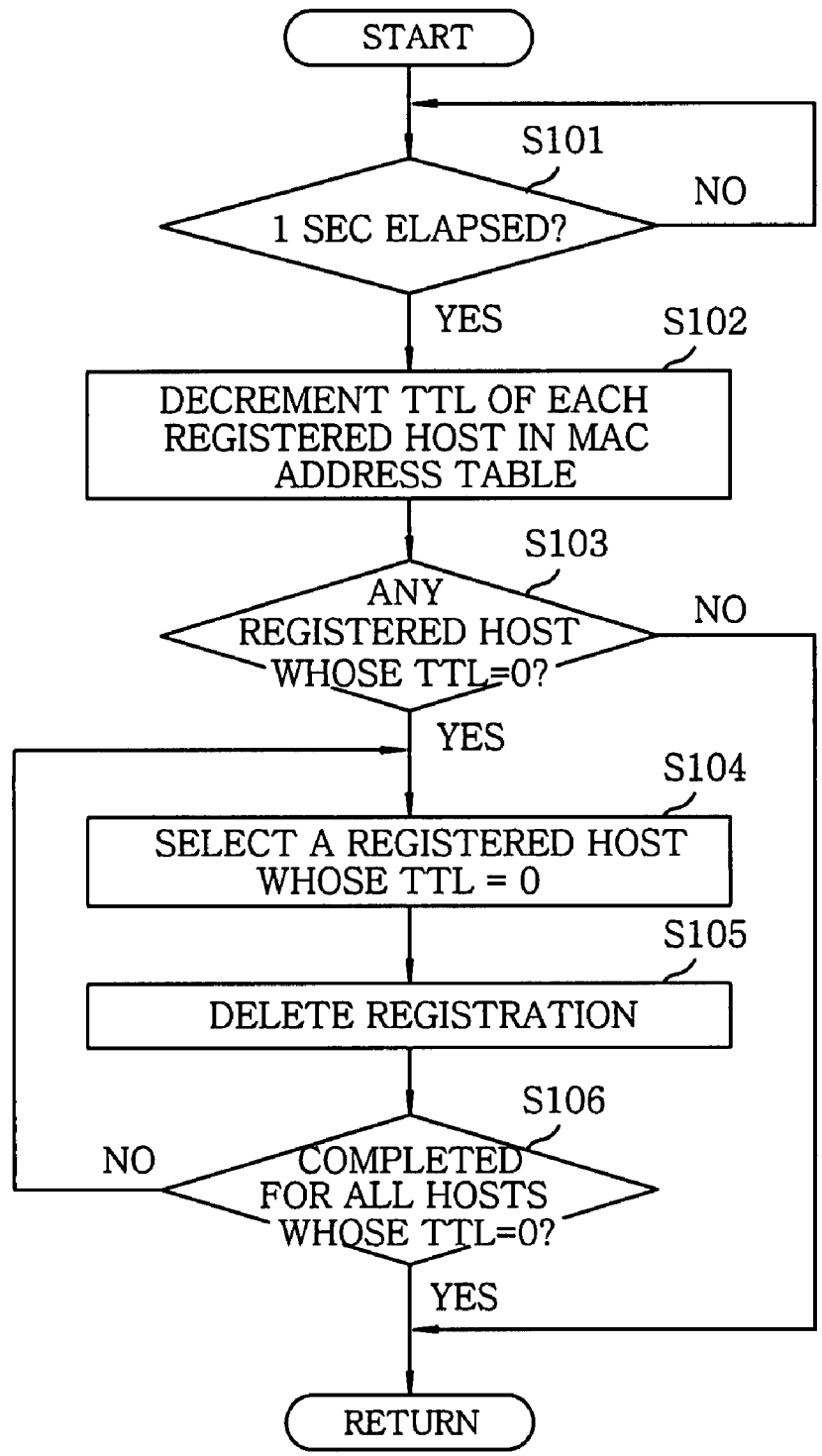
FIG. 7 is a flowchart illustrating an updating sequence for MAC address table.

Subsequently, a sequence in which the radio device 21 updates the TTL information registered in the MAC address table will now be described with reference to the flowchart of FIG. 7.

In step S101, the radio device 21 determines whether one second elapses. When one second elapses, the radio device 21 proceeds to the step S102 where it decrements TTL (normal TTL or SUSPEND TTL) of each registered host in the MAC address table. That is, when there is no communication with the host, the TTL value registered in the MAC address table is decremented in step S102. However, when one second does not elapse in step S101, the process returns to step S101.

Then, the radio device 21 determines in step S103 whether there is a host having TTL=0 in the MAC address table as a result of decrementing the TTL of each registered host. If there is such a host, the process proceeds to S104; if otherwise, the process returns to step S101.

In step S104, the radio device 21 selects a host having TTL=0 in the MAC address table.

If the state is "LOCAL", "AIR", or "SUSPEND" rather than "SEARCH" and there is no communication within the TTL set time (until TTL=0), the radio device 21 deletes the corresponding host from the MAC address table in step S105. Thereafter, the radio device 21 proceeds to step S106.

In step S106, the radio device 21 determines whether the process on every host having TTL=0 is completed. If the process on at least one of the host(s) having TTL=0 is not completed, the radio device 21 proceeds to step S104, because TTL=0 and other registered host(s) remain; if otherwise, the radio device 21 returns to step S101.

A sequence of establishing the MAC address table according to the type of the signal from the wireless communications unit 2 or the Ethernet interface unit 6 received by the radio device 21 will now be described with reference to FIGS. 8 to 12.

Although the sequence will be described by focusing on the radio device 21, CPU 3 shown in FIG. 2, in fact, performs the process using a program.

Figure 8:
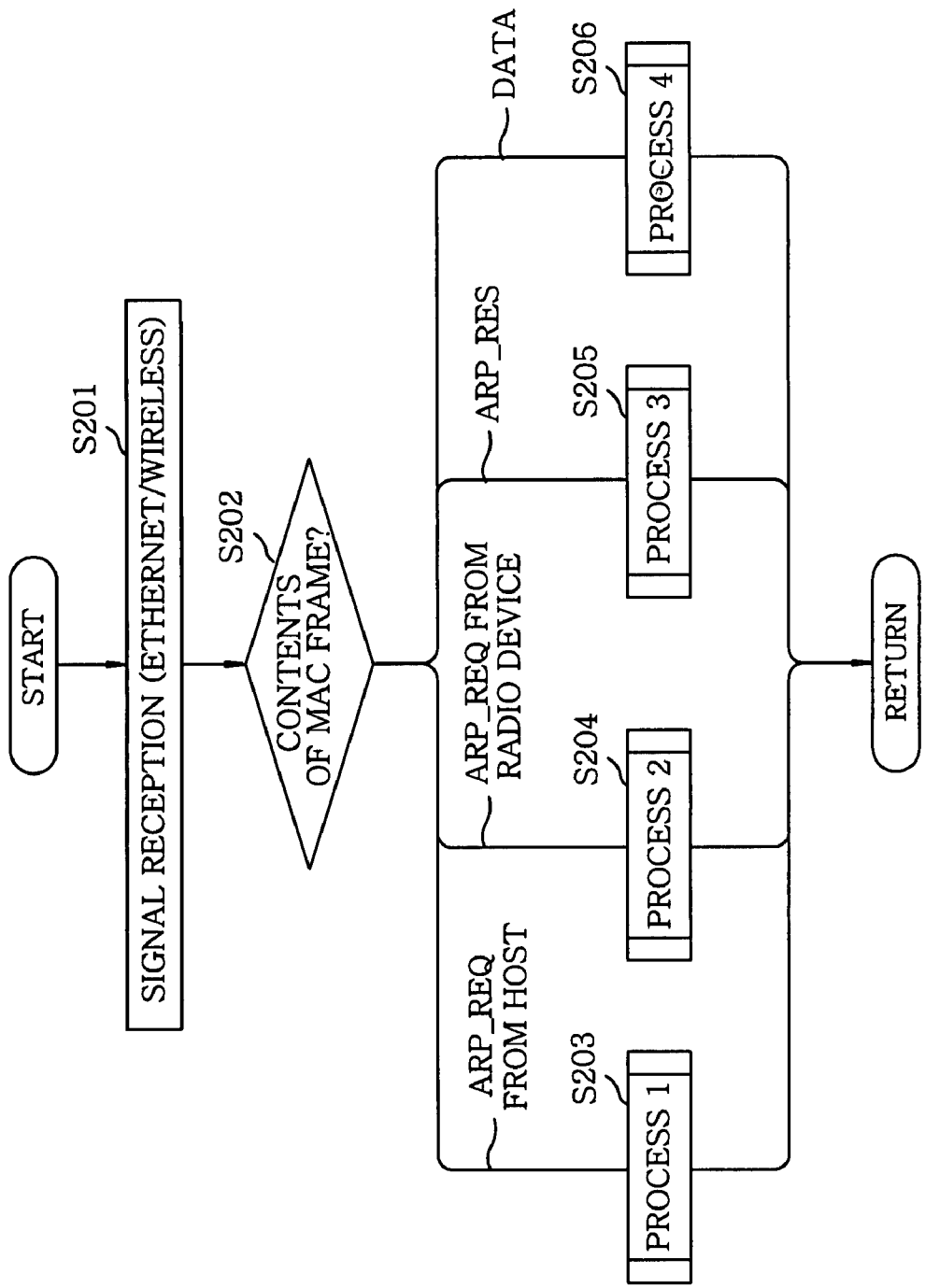
FIG. 8 is a flowchart illustrating a processing sequence of the radio device when a signal is received from a host or a radio device.

Referring to FIG. 8, the radio device 21 receives a signal from the Ethernet or via a wireless medium in step S201. In step S202, the radio device 21 inspects the contents of the MAC frame contained in the signal, and determines whether ARP_REQ, ARP_RES or data. If the received signal is either ARP_REQ or ARP_RES, it is deduced that the MAC frame has an ARP packet at a payload portion, as shown in FIG. 5B.

If the received packet signal is data, it is deduced that the MAC frame has only data at the payload portion.

Firstly, if the ARP packet of the MAC frame has ARP_REQ information at a code portion and source type information at a control information portion, which indicates that the signal is transmitted from the host 11, the radio device 21 determines that the signal received in step S201 is ARP_REQ from the host 11 and proceeds to a process 1 of step S203.

Next, if the ARP packet of the MAC frame has the ARP_REQ information at the code portion and source type information at the control information portion, which indicates that the signal is transmitted from other host 21, the radio device 21 determines that the signal received in step S201 is ARP_REQ from other host 21 and proceeds to a process 2 of step S204.

If the ARP packet of the MAC frame has the ARP_RES information at the code portion, the radio device 21 determines that the signal received in step S201 is ARP_RES from the host 11 and proceeds to a process 3 of step S205.

Finally, if the MAC frame has the data, rather than the ARP packet, the radio device 21 determines that the signal received in step S201 is data from the host 11 and proceeds to a process 4 of step S206.

The processes 1 to 4 of FIG. 8 will now be described with reference to FIGS. 9 to 12.

Figure 9:
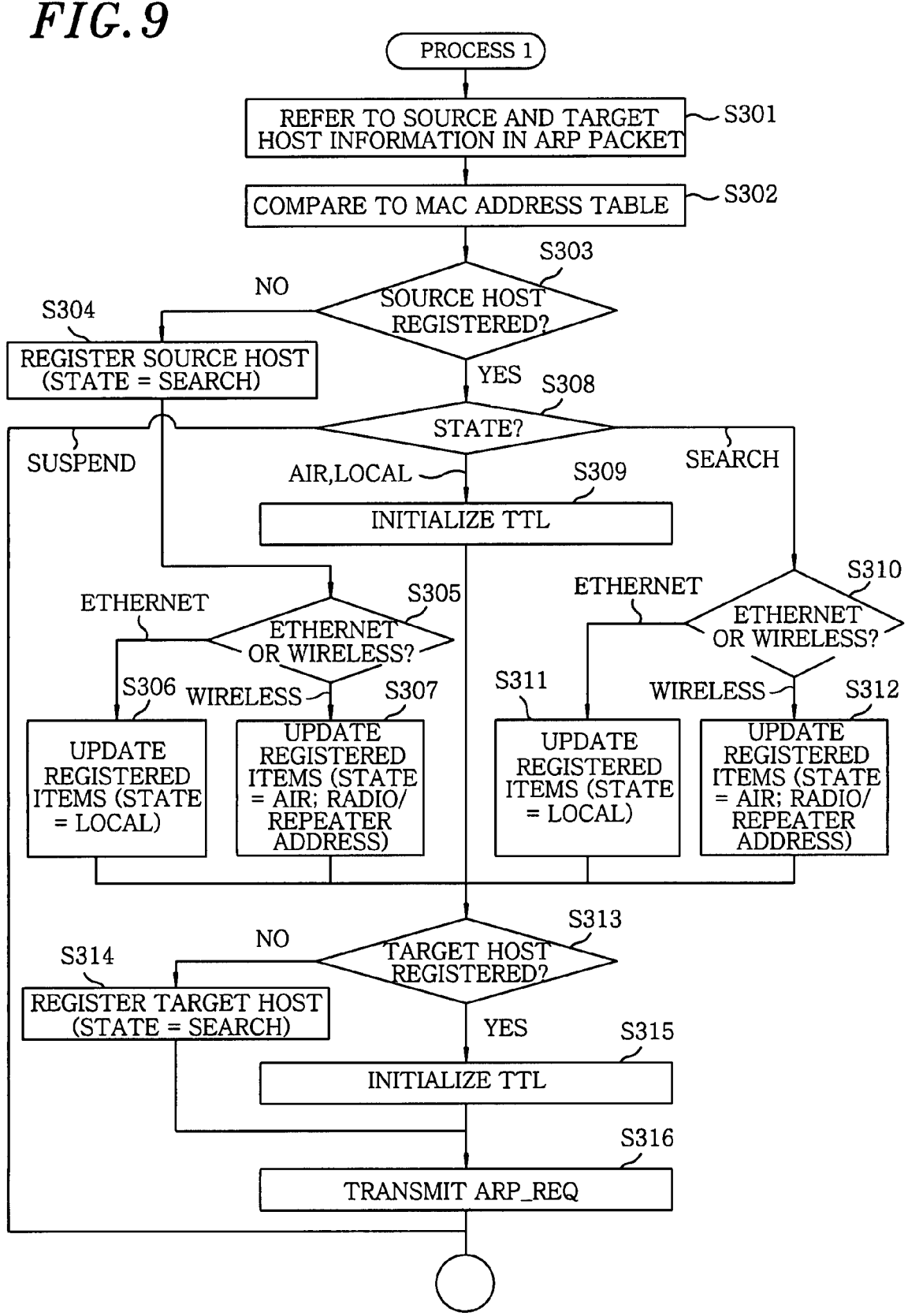
FIG. 9 is a flowchart illustrating a process corresponding to a case where a radio device receives ARP_REQ from a host.

FIG. 9 shows a sequence of the process 1. In step S301, the radio device 21 refers to the information of the source and target hosts contained in the ARP packet, which is received in step S201 of FIG. 8. Among the hosts 11 on the network, a host that desires to obtain the MAC address of the target host through ARP becomes a source host, and a host from which the MAC address is obtained through ARP becomes a target host. The source host information is a source MAC address and a source IP address contained in the ARP packet, and the target host information is a target MAC address and a target IP address contained in the ARP packet.

In step S302, the radio device 21 compares the received ARP packet information to the information of its MAC address table. By referring to the MAC address table, the radio device 21 determines in step S303 whether the information of the source host, which transmits ARP_REQ, is registered in the MAC address table.

If the information of the source host is not registered in step S303, the radio device 21 proceeds to step S304 where it registers information for the source host of ARP_REQ, which has not yet been registered, in the MAC address table. Since ARP_REQ contains information of MAC and IP addresses of the ARP_REQ source host and IP address of the target host, the radio device 21 registers such information. Upon initial registration in the MAC address table, an initial state value is also registered as "SEARCH".

The radio device 21 also determines in step S305 whether ARP_REQ is received from the source host of ARP_REQ via the Ethernet in the same segment or wirelessly received from the source host of ARP_REQ via other radio device 21 or the repeater 22. When the radio device 21 receives ARP_REQ via an Ethernet interface unit 6, it determines the communications to be via the Ethernet. On the other hand, when the radio device 21 receives ARP_REQ via the wireless communications unit 2, it determines the communications to be via a radio device. If the radio device 21 is connected to the same Ethernet as that of the source host of ARP_REQ, it proceeds from step S305 to step S306 where registered information is updated. That is, the radio device 21 updates the state of the source host of ARP_REQ, which has been registered as "SEARCH" in the MAC address table in step S304, into "LOCAL". Simultaneously, the radio device 21 initializes TTL.

However, when the radio device 21 receives ARP_REQ wirelessly from the source host via other radio device 21 or the repeater 22, it proceeds from step S305 to step S307 where it changes the state of the source host, which has been registered as "SEARCH" in the MAC address table in step S304, into "AIR". As the state of the source host of ARP_REQ is registered as "AIR" in the MAC address table, the radio device 21 registers the radio device address of said other radio device 21 or the repeater address of the repeater 22 in the MAC address table, unlike the case where ARP_REQ is sent from the source host to the radio device 21. That is, since the radio device frame (see FIG. 5A) received via the wireless medium contains a source radio device address of said other radio device 21, the radio device 21 is allowed to register the source radio device address in the MAC address table. Likewise, when the radio device 21 receives ARP_REQ wirelessly via a repeater, which contains the source radio device address of the repeater 22 (see FIG. 5C), the radio device 21 is allowed to register the source radio device address of the repeater in the MAC address table. As the state is changed in steps S306 and S307, the radio device 21 initializes the TTL of the MAC address table for the host 11.

After the state of the source host of ARP_REQ is registered in the MAC address table in step S307, the radio device 21 proceeds to step S313.

Meanwhile, if the information of the source host is registered in the MAC address table in step S303, the radio device 21 proceeds to step S308 where it determines the state of the source host of ARP_REQ in the MAC address table. If the state of the source host is "AIR" or "LOCAL", which indicates that communications from the source host to the radio device 21 have been performed, the radio device 21 initializes TTL in step S309 and proceeds to step S313.

On the other hand, if the state of the source host is "SEARCH", the MAC address of the target host and information on the route to the target host are not obtained but the MAC address of the source host and the information on the route to the source host are obtained. After obtaining the information from the source host, the radio device 21 determines in step S310 whether the source host of ARP_REQ and the radio device 21 are connected to the Ethernet in the same segment or the radio device 21 wirelessly receives ARP_REQ via other radio device 21 or the repeater 22 from the source host of ARP_REQ.

Since steps S310 to S312 shown in the process 1 are same as steps S305 to S307, descriptions thereof will be omitted.

When the state of the source host is "SUSPEND" in step S308, the process is terminated.

In step S313, the radio device 21 determines whether the information for the target host is registered in the MAC address table.

If the information for the target host is not registered, the radio device 21 proceeds to step S314 where it registers the information for the target host. Here, since the radio device 21 recognizes the IP address of the target host, but not the MAC address, it registers the IP address of the source host in the MAC address table and registers the state as "SEARCH". As the state is registered in the MAC address table, the radio device 21 initializes TTL. Thereafter, the radio device 21 proceeds to step S316.

However, if the information for the target host is registered in step S313, the radio device 21 proceeds to step S315 where it initializes TTL and then proceeds to step S316.

In step S316, the radio device 21 broadcasts ARP_REQ received from the source host to other radio device 21 or the repeater 22, or transmits it via the Ethernet.

Figure 10:
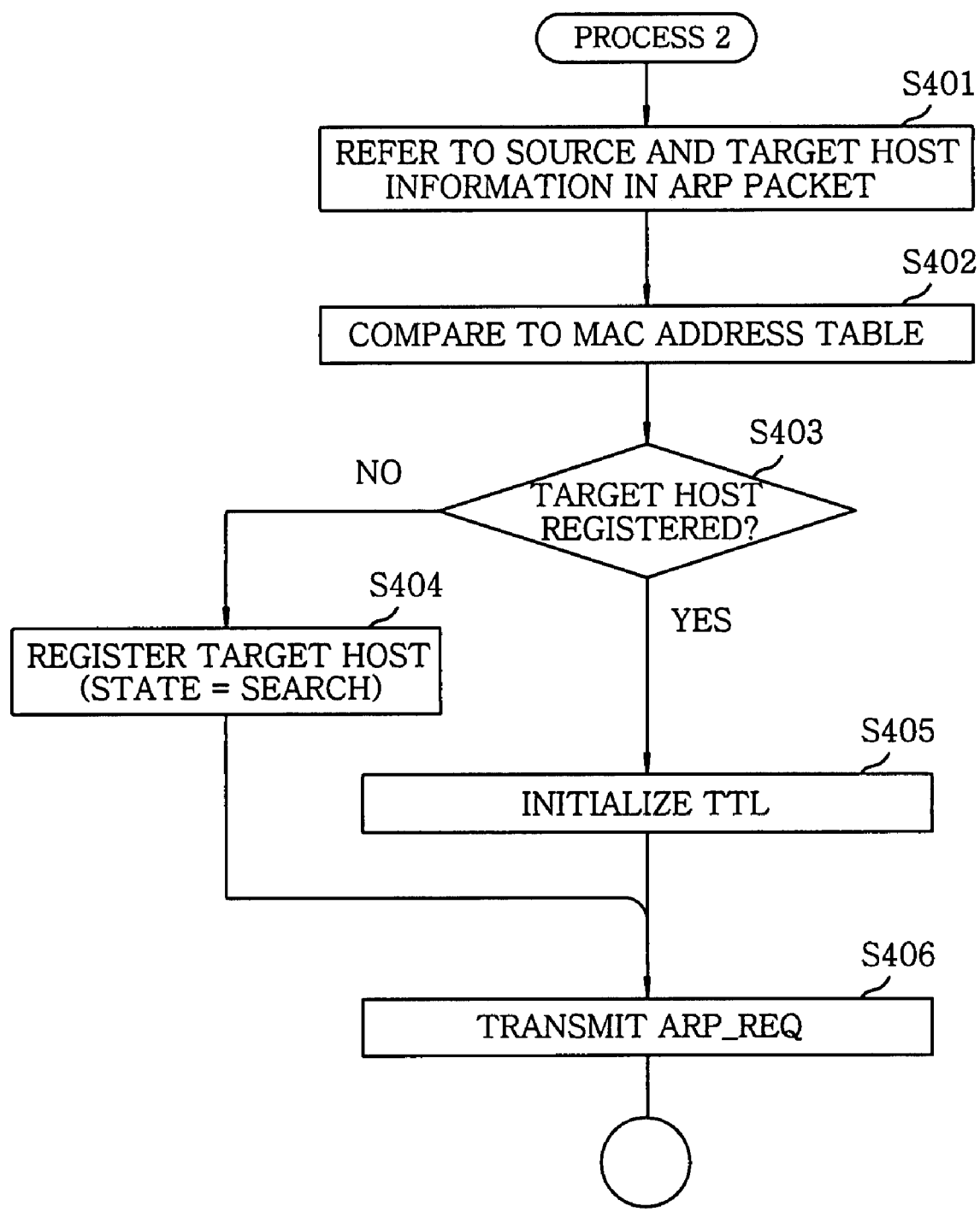
FIG. 10 is a flowchart illustrating a process corresponding to a case where a radio device receives ARP_REQ from the other radio device.

The process 2 of FIG. 8 will now be described with reference to FIG. 10. In the process 2, the ARP_REQ source is not the host but the radio device 21, unlike the process 1. Accordingly, in the process 2, the sequence for registering the source host information is unnecessary, and only the target host information is referred to and registered, unlike the process 1. As a result, the sequence of steps S303 to S312 in the process 1 where the source host information is registered in the MAC address table is unnecessary in the process 2.

Here, since steps S401 to S402 are same as steps S301 to S302 of FIG. 9 and steps S403 to S406 are same as steps S313 to S316 of FIG. 9, descriptions thereof will be omitted. However, in step S406 of the process 2, the radio device 21 receives ARP_REQ from other radio device 21 via a wireless medium. Accordingly, the received ARP_REQ is not broadcast to the other radio device 21, but transmitted to the host connected to the Ethernet.

The process 3 of FIG. 8 will now be described with reference to FIG. 11. In process 3, ARP_RES is transmitted from the source host, unlike the process 1. Here, the source host of the process 1 is the target host of the process 3, and the target host of the process 1 is the source host of the process 3. As such, the source host and the target host of the process 1 are contrary to those of the process 3. However, since steps S301 to S312 shown in FIG. 9 are same as step S501 to S512 shown in FIG. 11, descriptions thereof will be omitted.

In step S513, the radio device 21 determines whether the target host information is registered in the MAC address table. If the target host information is not registered, the radio device 21 proceeds to step S514 where the radio device 21 performs the ARP process. That is, if the target host information is not registered in the MAC address table, the radio device 21 has to perform the ARP process for itself to obtain information on the route to the target host. After obtaining the target host information through the ARP process, the radio device 21 registers the information in the MAC address table.

In step S515, after obtaining the route information by referring to the MAC address table, the radio device 21 transmits ARP_RES received from the source host to the target host.

However, if the target host information is registered in step S513, the radio device 21 proceeds to step S516 where it determines the state of the target host. When the state of the target host is registered as "AIR" or "LOCAL" in the MAC address table, the radio device 21 initializes the TTL of the MAC address table in step S517 and then transmits the received ARP_RES to the target host in step S518.

Further, when the state of the target host is registered as "SEARCH" in the MAC address table, the radio device 21 transmits the received ARP_RES to the target host in step S519.

Finally, when the state of the target host is registered as "SUSPEND" in the MAC address table, the radio device 21 deletes received ARP_RES in step S520.

Figure 12:
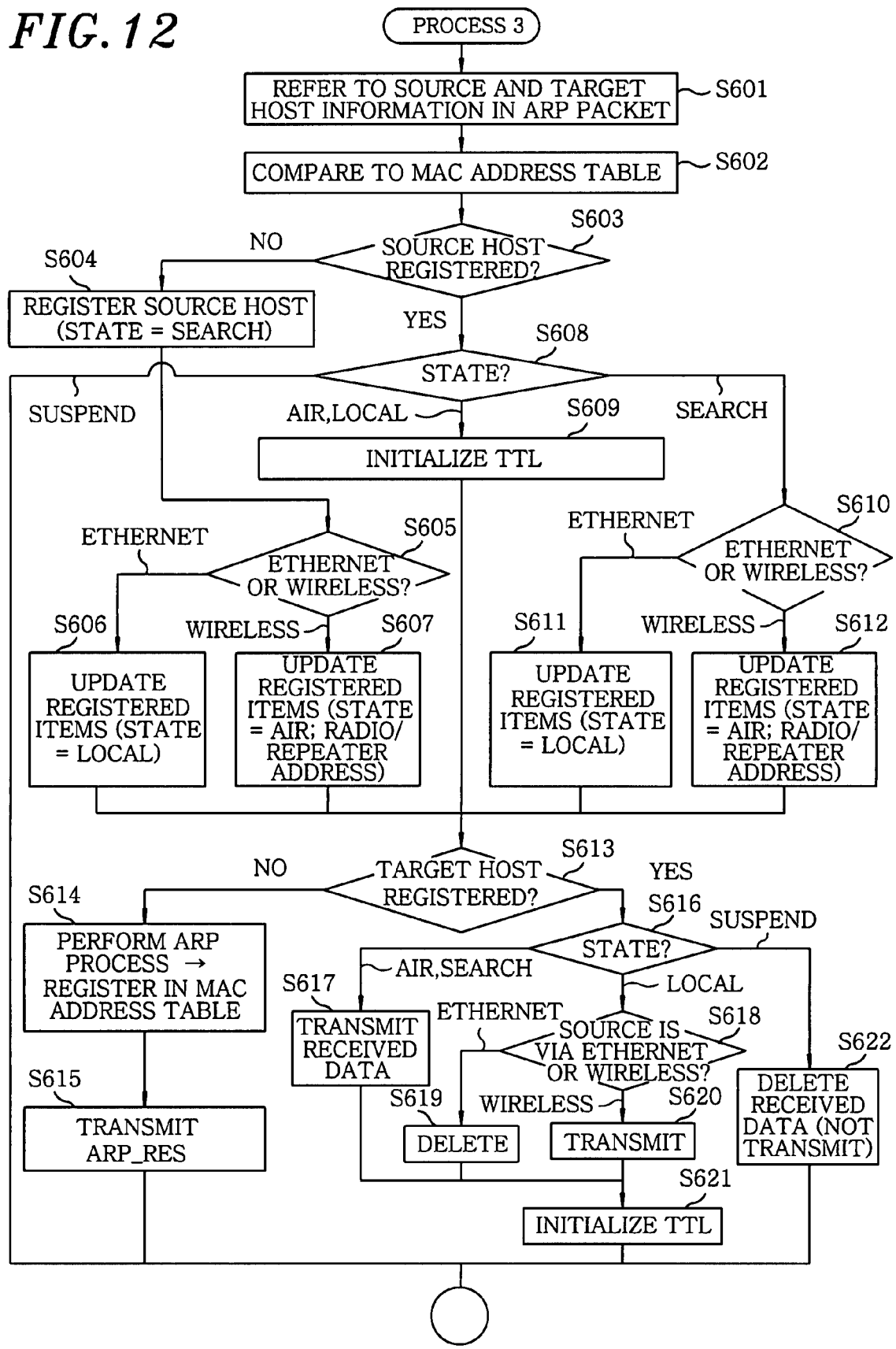
FIG. 12 is a flowchart illustrating a process corresponding to a case where a radio device receives data from a host.

FIG. 12 illustrates a sequence corresponding to the process 4 of FIG. 8, in which the radio device 21 receives data from the host 11.

The process 4 differs from the process 1 in that the signal transmitted by the host is not ARP_REQ or ARP_RES but mere data. In this process, since the transmitted signal is data and the ARP process is not performed, the "destination host", instead of the "target host", is dealt with in S613.

Figure 11:
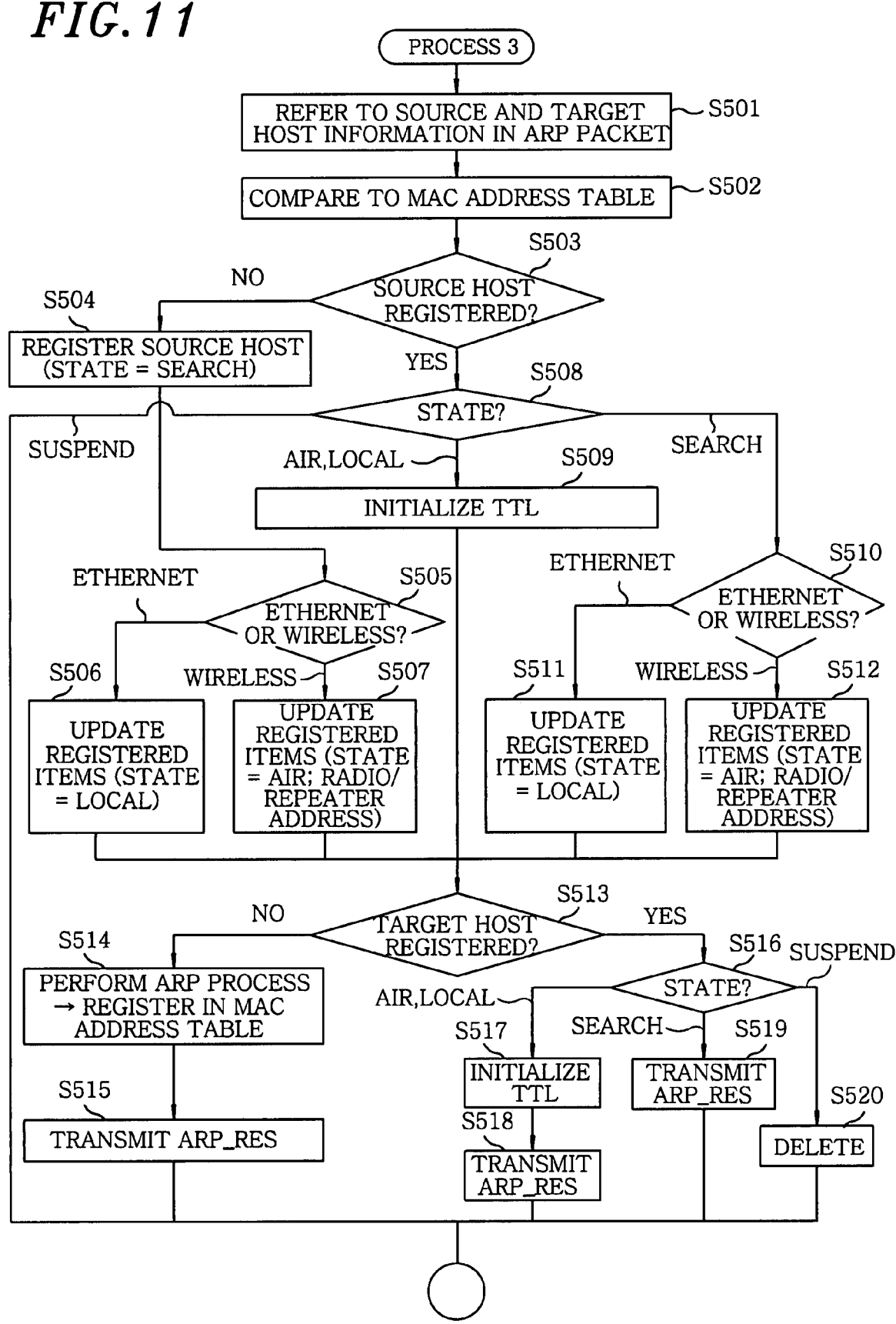
FIG. 11 is a flowchart illustrating a process corresponding to a case where a radio device receives ARP_RES from a host.

However, since steps 601 to S612 shown in FIG. 12 are same as step S301 to S312 shown in FIG. 9 and steps S613 to S615 shown in FIG. 12 are same as steps S513 to S515 shown in FIG. 11, a description thereof will be omitted.

If the destination host is registered in step S613, the radio device 21 proceeds to the step S616 where it refers to the state of the destination host in the MAC address table. When the state of the destination host is registered as "AIR" or "SEARCH" in the MAC address table, the radio device 21 transmits the received data to the destination host in step S617 and then proceeds to step S621.

When the state of the destination host is registered as "SUSPEND" in the MAC address table in step S616, the radio device 21 determines that the data destination is unknown and proceeds to step S622 where it deletes the received data and does not transmit it.

Thereafter, the radio device 21 ends the process.

When it is determined in step S616 that the state of the source host is registered as "LOCAL" in the MAC address table, the radio device 21 determines in step S618 whether the state of the destination host is "Ethernet" or "wireless". Since data received while the state of the destination host is "Ethernet" need not be sent to other segment, if the state of the destination host is "Ethernet", the radio device 21 proceeds to step S619 where it deletes the received data.

However, if the state of the destination host is "wireless", the radio device 21 proceeds to step S620 where it transmits the received data to the target host and then proceeds to step S621.

In step S621, the radio device 21 updates TTL in response to the new communication.

In the above embodiment, "11-1" designates the source host in FIG. 1 and "13" designates the destination host, and the MAC address table is established by the radio bridging device on the LAN. However, it will be easily understood that, even if "11-2" is the source host, the state of the destination host "11-3" and the corresponding information of host address and the state thereof may be recorded together with the communications route in each radio device in a sequence same as that described above.

Preferably, TTL (Time To Live) recorded on the MAC address table is selected to be a value for providing the highest communications efficiency, in consideration of the number of hosts on the LAN, the number of the divided areas (segments) of the LAN, a moving state of each host, and the like.

In particular, it is preferable that the SUSPEND TTL is set to be shorter than the normal TTL. If the host on the LAN is movable and frequently moves into or out of a specific segment, such a setting is effective to improve a communications return time.

Further, if the radio device (a radio bridging device) for connecting between the segments need not be fixed, and has a communications function of connecting between wired segments within a certain range, it may be used while moving within a specific range.

While the invention has been shown and described with respect to the embodiments, it will be understood by those skilled in the art that various changes and modifications may be made without departing from the scope of the invention as defined in the following claims.

What is claimed is:

1. A radio bridging device used for a communications network in which a local area network having one or more hosts is divided into a plurality of segments, and one or more radio bridging devices are connected to each of the segments so that the segments are connected to one another via said one or more radio bridging devices, comprising:

wherein, if a source host in the communications network transmits a communications request directed to a destination host, the radio bridging device records an IP address and a MAC address of the source host and an IP address of the destination host in a local table, wherein the radio bridging device performs:

a first step in which a state of the source host is set as "LOCAL" if the source host belongs to one of the segments where the radio bridging device belongs, and set as "AIR" if the source host belongs to another of the segments connected via the radio bridging device, a state of the destination host is set as "SEARCH", and the states of the source host and the destination host are recorded in the local table, a second step in which an ARP request directed to the destination host is broadcast if the state of the destination host is "SEARCH", and then if an ARP response is received from the destination host, the state of the destination host is changed from "SEARCH" to "LOCAL" or "AIR" to be recorded in the local table together with a MAC address of the destination address, and then if another radio bridging device is interposed in a transmission path to the MAC address of the destination host, a radio device address of said another radio bridging device is acquired to be retained in the local table for a specific amount of time, and a third step in which, if the ARP response to the ARP request is not received within a specific timeout time, the state of the destination host is changed into "SUSPEND" to be recorded in the local table together with a suspend TTL (Time To Live) time.

2. The radio bridging device of claim 1, wherein a repeater having a repeater address is interposed between two of the radio bridging devices that connect between the segments, and the repeater address is recorded as route information.

3. The radio bridging device of claim 1, wherein address information of each host, state information of each host and route information of each host are recorded in the local table, and deleted therefrom when the suspend TTL time elapses.

4. The radio bridging device of claim 3, wherein the suspend TTL time of the host whose state is set as "SUSPEND" is shorter than that of the host whose state is set as "LOCAL" or "AIR".

5. The radio bridging device of claim 4, wherein a communication with the host whose state is set as "SUSPEND" is blocked within the suspend TTL time of the host whose state is set as "SUSPEND".

6. The radio bridging device of claim 2, wherein the repeater includes a communications device having a wireless bridging function.

7. The radio bridging device of claim 1, wherein the host is allowed to move out of the local area network.

8. The radio bridging device of claim 2, wherein the host is allowed to move out of the local area network.

9. The radio bridging device of claim 3, wherein the host is allowed to move out of the local area network.

10. A communications system, comprising: a radio bridging device used for a communications network in which a local area network having one or more hosts is divided into a plurality of segments, and one or more radio bridging devices are connected to each of the segments so that the segments are connected to one another via said one or more radio bridging devices, wherein, if a source host in the communications network transmits a communications request directed to a destination host, the radio bridging device records an IP address and a MAC address of the source host and an IP address of the destination host in a local table, wherein the radio bridging device performs:

a first step in which a state of the source host is set as "LOCAL" if the source host belongs to one of the segments where the radio bridging device belongs, and set as "AIR" if the source host belongs to another of the segments connected via the radio bridging device, a state of the destination host is set as "SEARCH", and the states of the source host and the destination host are recorded in the local table, a second step in which an ARP request directed to the destination host is broadcast if the state of the destination host is "SEARCH", and then if an ARP response is received from the destination host, the state of the destination host is changed from "SEARCH" to "LOCAL" or "AIR" to be recorded in the local table together with a MAC address of the destination address, and then if another radio bridging device is interposed in a transmission path to the MAC address of the destination host, a radio device address of said another radio bridging device is acquired to be retained in the local table for a specific amount of time, and a third step in which, if the ARP response to the ARP request is not received within a specific timeout time, the state of the destination host is changed into "SUSPEND" to be recorded in the local table together with a suspend TTL (Time To Live) time.

* * * * *